United States Patent
Kale

(10) Patent No.: US 12,254,401 B2
(45) Date of Patent: Mar. 18, 2025

(54) ARTIFICIAL NEURAL NETWORK MODEL SELECTION

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 1134 days.

(21) Appl. No.: 17/116,847

(22) Filed: Dec. 9, 2020

(65) Prior Publication Data

US 2022/0180185 A1    Jun. 9, 2022

(51) Int. Cl.
*G06N 3/08* (2023.01)
*G06F 18/21* (2023.01)
*G06N 3/045* (2023.01)
*G06T 7/00* (2017.01)

(52) U.S. Cl.
CPC ............. *G06N 3/08* (2013.01); *G06F 18/217* (2023.01); *G06N 3/045* (2023.01); *G06T 7/0002* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 9,971,540 B2 | 5/2018 | Herrero Abellanas et al. | |
| 2019/0235462 A1 | 8/2019 | Cella et al. | |
| 2020/0012917 A1 | 1/2020 | Pham et al. | |
| 2020/0193234 A1* | 6/2020 | Pai | G06F 16/904 |
| 2020/0320419 A1* | 10/2020 | Guo | G06N 20/00 |

FOREIGN PATENT DOCUMENTS

| | | | |
|---|---|---|---|
| CN | 108615071 | 10/2018 | |
| CN | 110824587 | 2/2020 | |
| WO | 2020000383 | 1/2020 | |
| WO | WO-2020000383 A1 * | 1/2020 | ............. G06F 1/329 |

OTHER PUBLICATIONS

International Search Report and Written Opinion from related PCT Application No. PCT/US2021/060964, dated Apr. 5, 2022, 13 pages.

* cited by examiner

*Primary Examiner* — Delomia L Gilliard
(74) *Attorney, Agent, or Firm* — Brooks, Cameron & Huebsch, PLLC

(57) ABSTRACT

A first artificial neural network (ANN) model implemented on a memory device can be executed on first data from an imaging device corresponding to a first image. A second ANN model implemented on the memory device can be executed on second data from the imaging device corresponding to a second, subsequent image. Whether an accuracy value of results yielded from the execution of the second ANN model on the second data is less than a threshold accuracy value can be determined by the memory device. Responsive to determining that the accuracy value is less than the threshold accuracy value, the first ANN model can be executed on third data from the imaging device corresponding to a third image subsequent to the second image. Such selection of ANN models can reduce excess power consumption of a memory device on which the ANN models are implemented.

21 Claims, 6 Drawing Sheets

ARTIFICIAL NEURAL NETWORK MODEL SELECTION

TECHNICAL FIELD

The present disclosure relates generally to memory devices, and more particularly, to apparatuses and methods related to selection of artificial neural network (ANN) models.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
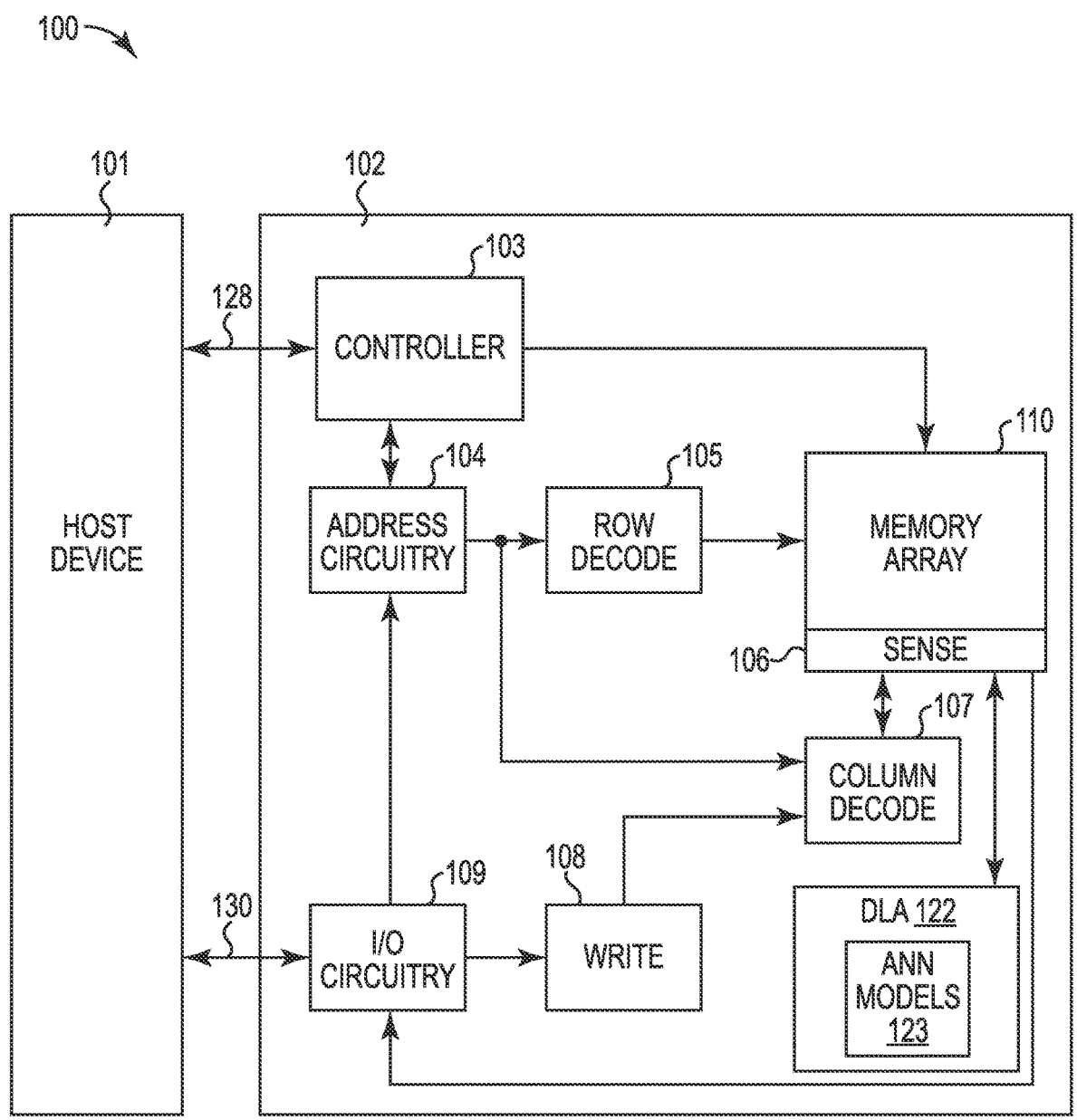
FIG. 1 is a block diagram of an apparatus in the form of a system including a memory device with ANN models implemented thereon in accordance with a number of embodiments of the present disclosure.
Figure 2:
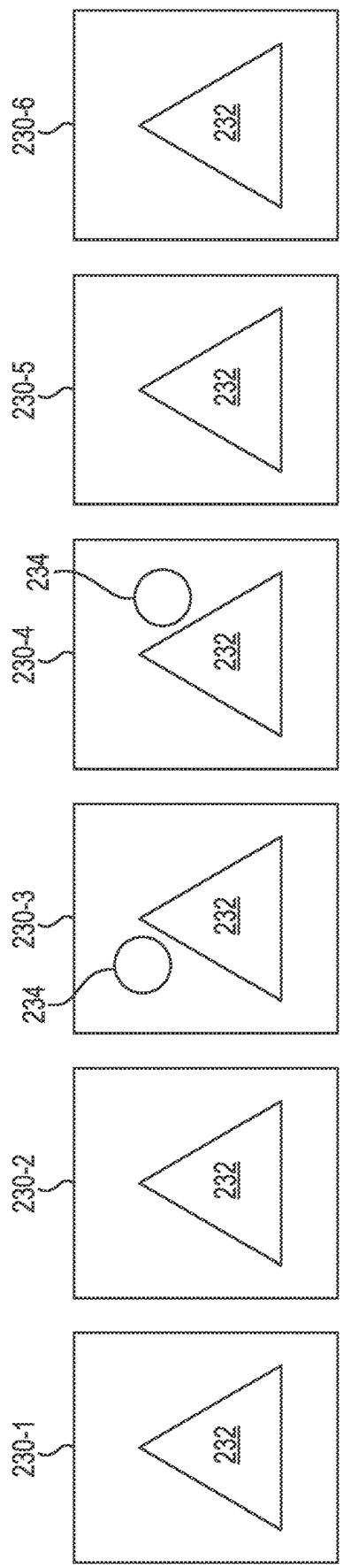
FIGS. 2A-2F are illustrations of demonstrating a change in images captured by an imaging device in accordance with a number of embodiments of the present disclosure.

The present disclosure includes apparatuses and methods related to selection of artificial neural network (ANN) models. An ANN is an example of artificial intelligence (AI). As used herein, AI refers to an ability of an apparatus and/or system to make decisions based on results from past decisions. AI capable devices can be configured to store patterns and/or examples that can be utilized at a later time to take actions. Deep learning refers to an ability of a device to learn from data provided as examples. Deep learning can be a subset of AI. Neural networks, among other types of networks, can be classified as deep learning. The low power, inexpensive design of deep learning accelerators (DLAs) can be implemented in internet-of-things (IOT) devices, among other types of devices.

An ANN can provide learning by forming probability weight associations between an input and an output. The probability weight associations can be provided by a plurality of nodes that comprise the ANN. The nodes together with weights, biases, and activation functions can be used to generate an output of the ANN based on the input to the ANN.

Inexpensive and energy-efficient AI accelerators, such as DLAs, can be implemented on a same die, substrate, or interposed as a memory array of a memory device. This location of the DLA in proximity to the memory array may be referred to as an edge of a memory device. The edge of the memory device can also refer to an area of the memory device other than an area of the memory device occupied by the memory array and/or the sensing circuitry. For example, an edge of the memory device can refer to an output and/or input path of a memory device, where the output path and/or the input path is used to transfer data to and/or from a memory array of the memory device. In some examples, the DLA is integrated into the periphery of the memory array in logic physically located beneath the memory array (e.g., in CMOS under the array).

ANN models can be implemented on a DLA of a memory device. The DLA can include hardware and/or software configured to mimic neuro-biological architectures present in a biological nervous system according one or more ANN models. ANN models can include a multilayer neuron architecture referred to as a perceptron. A neuron in a multilayered neuron architecture can be referred to as an artificial neuron. An artificial neuron can combine one or more inputs received to produce an output. For example, an artificial neuron can include circuitry configured to mimic and/or perform one or more functions of a biological neuron. Outputs of a first artificial neuron can be propagated to a second artificial neuron utilizing an artificial synapse.

Multiple ANN models can be implemented on a memory device. For example, various ANN models can be implemented on a DLA. An ANN model can have one or more particular parameters that direct execution of the ANN model on data. As used herein, "execution of an ANN model on data" refers to performance of calculations on the data using an ANN according to parameters of the ANN model. An ANN model can have parameters (be configured) such that execution of the ANN model yields results of at least a particular accuracy. As used herein, "accuracy of results yielded from execution of an ANN model" refers to a quantity of correct predictions made by the ANN model relative to a quantity of total predications made by the ANN model. Accuracy of particular results yielded from execution of an ANN model can be referred to as, and expressed as, an accuracy value. Examples of parameters of an ANN model include, but are not limited to, a maximum quantity of multiply and accumulate circuits (MACs) of an ANN to be used during execution of the ANN model. Other non-limiting examples of parameters of an ANN model can be a maximum quantity of iterations of computations during execution of the ANN model and a maximum quantity of computations to be performed during execution of the ANN model. In at least one embodiment, execution of an ANN model implemented on a DLA can include utilization of at most a particular quantity (e.g., a subset) of MACs implemented on the DLA. Such parameters of an ANN model can limit the computational capability of the ANN model, which, in turn, can limit the accuracy of results yielded from execution of the ANN model. However, what may be lost in computational capability can be gained in reduced resource consumption.

An ANN model configured to yield high-accuracy results can utilize a greater quantity of MAC, perform a greater quantity of iterations of computations, and/or perform a greater quantity of computations during execution of the ANN model than a different ANN model configured to yield low-accuracy results. Execution of an ANN model configured to yield high-accuracy results can consume more resources than execution of an ANN model configured to yield low-accuracy results. For example, execution of an ANN model configured to yield high-accuracy results can have greater power requirements (greater power consumption) than execution of an ANN model configured to yield results of a lower accuracy.

In some previous approaches, ANN models configured to yield high-accuracy results may be executed in situations that do not require high-accuracy results. Thus, some previous approaches may expend more power executing an ANN model having high computational capability when executing an ANN model having low computational capability yields sufficiently accurate results. Executing an ANN model having high computational capability in such circumstances expends excess power relative to executing an ANN model having low computational capability. In low-power devices, such as IoT devices, reducing excess power expenditures is important.

At least one embodiment of the present disclosure addresses these shortcomings and other issues associated with some previous approaches by enabling a memory device to execute an ANN model, selected from multiple ANN models implemented on the memory device, based on a previous result from executing the same ANN model or executing a different ANN model. For example, an ANN model, implemented on a memory device, can be executed on data corresponding to an image captured by an imaging device. Execution of the ANN model on that data can yield results having at least a particular accuracy based on parameters of the ANN model.

At least one embodiment can include selection of an ANN model based on changes from one image captured by an imaging device to another, subsequent image captured by the imaging device. For example, an imaging device installed in the front of a house can primarily capture images of the front yard of the house. However, there may be changes in the images captured by the imaging device including, but not limited to, vehicle and/or human traffic. As another example, an imaging device installed in a vehicle, autonomous or otherwise, can primarily capture images of the road on which the vehicle is traveling. Changes in images captured by the imaging device installed the vehicle can include but are not limited to, another vehicle on the road. Although a road can change gradually from one image to another image (e.g., turns), as described further in association with FIGS. 2A-2F gradual changes in images can be distinguished from rapid changes (e.g., a stopped car ahead).

The terms "heavy" and "light" with respect to ANN models can refer to a computational capability of the ANN model. A heavy ANN model can yield results of a relatively higher accuracy than the results yielded by execution of the light ANN model implemented on the same memory device. For example, execution of a heavy ANN model can utilize a greater quantity of MACs of an ANN than execution of a light ANN model. Executing a light ANN model can have lesser power requirements (e.g., consume less power) than executing a heavy ANN model.

In response to the accuracy of a result of executing a particular ANN model (e.g., the light ANN model) being lower than a threshold accuracy, a different ANN model (e.g., the heavy ANN model) can be executed on data corresponding to an image captured by the imaging device. For example, a threshold accuracy value can be 70%. If execution of a light ANN model yields results having an accuracy value less than 70%, then a heavy ANN model can be selected (e.g., selected dynamically) to be executed next. Because the accuracy of results from executing the light ANN model dropped below the threshold accuracy, the different ANN model can be executed on data corresponding to a subsequent image captured by the imaging device. The memory device can dynamically select and execute the light ANN model (switch from executing the heavy ANN model to executing the light ANN model) on data corresponding to a subsequent image captured by the imaging device. But if execution of the light ANN model yields results having an accuracy below the threshold accuracy again, then the memory device can select and execute the heavy ANN model (switch from executing the light ANN model to executing the heavy ANN model) data corresponding to a subsequent image captured by the imaging device.

Executing the heavy ANN model when an accuracy of results yielded by execution of the light ANN model yield results is insufficient can reduce resource requirements of a memory device on which the light and heavy ANN models are implemented. Thus, power consumption by the memory device can be reduced by executing the heavy ANN model when an accuracy of results yielded by execution of the light ANN model is insufficient as compared to executing the heavy ANN model exclusively, for example.

At least one embodiment of the present disclosure addresses shortcomings and other issues associated with some previous approaches, such as the shortcomings and issues described herein, by enabling a memory device to execute an ANN model selected from multiple ANN models implemented on the memory device, based on a comparison of images captured by an imaging device. For example, a memory device can include control circuitry (e.g., a controller) configured to, in response to determining at least a threshold level of difference between a first image and a second image captured by an imaging device, execute a first ANN model implemented on the memory device on data corresponding to the second image. In response to determining lower than the threshold level of difference between the first and second images, the control circuitry can be configured to execute a second ANN model implemented on the memory device on the data corresponding to the second image. The second ANN model can yield results having a lower minimum accuracy than results yielded from execution of the first ANN model. Thus, in this example, the second ANN model is a light ANN model and the first ANN model is a heavy ANN model.

By executing a heavy ANN model when there is a particular level of difference between two images captured by an imaging device (e.g., a threshold level of difference)

rather than executing the heavy ANN model exclusively, for example, resource requirements of a memory device on which the heavy ANN model are implemented can be reduced. As described further in association with FIGS. 2A-2F, power requirements of a memory device can be reduced by executing a light ANN model on data corresponding to images captured by an imaging device unless there is at least a threshold level of difference between two images captured by the imaging device. Execution of the light ANN model can have lesser power requirements than execution of the heavy ANN model.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a system 100 including a memory device 102 with ANN models 123 implemented thereon in accordance with a number of embodiments of the present disclosure. As used herein, a memory device 102, a controller 103, a memory array 110, sensing circuitry 106, and/or DLA 122 might also be separately considered an "apparatus."

The system 100 includes a host device 101 coupled to the memory device 102, which includes a memory array 110. The host device 101 can represent an imaging device coupled to the memory device 102, a computing device coupled to the memory device 102, or, in at least one embodiment the host device 101 can represent multiple, separate devices (such as an imaging device and a computing device) coupled to the memory device 102. Examples of the host device 101 include a personal laptop computer, a desktop computer, a digital camera, a smart phone, a memory card reader, an image sensor, and ISP, or a vehicle (e.g., an autonomous vehicle), among various other types of peripheral devices. The host device 101 can include a system motherboard and/or backplane and can include a number of processing devices (e.g., one or more processors, microprocessors, or some other type of controlling circuitry). The system 100 can include separate integrated circuits or both the host device 101 and the memory device 102 can be on the same integrated circuit.

In the example shown in FIG. 1, the host device 101 is responsible for executing an operating system (OS) and/or various applications that can be loaded thereto (e.g., from the memory device 102 via the controller 103). The OS and/or various applications can be loaded from the memory device 102 by providing access commands from the host device 101 to the memory device 102 to access the data comprising the OS and/or the various applications. The host device 101 can also access data utilized by the OS and/or various applications by providing access commands to the memory device 102 to retrieve said data utilized in the execution of the OS and/or the various applications.

For clarity, the system 100 has been simplified to focus on features with particular relevance to the present disclosure. The memory array 110 can be a hybrid memory cube (HMC), DRAM array, static random access memory (SRAM) array, spin-transfer torque random access memory (STT RAM) array, PCRAM array, thyristor random access memory (TRAM) array, RRAM array, NAND flash array, and/or NOR flash array, for instance. In at least one embodiment, the memory array 110 can be a solid state drive (SSD). The memory array 110 can comprise memory cells arranged in rows coupled by access lines, which may be referred to herein as word lines or select lines, and columns coupled by digit lines, which may be referred to herein as bit lines, data lines, or sense lines. Although a single memory array 110 is shown in FIG. 1, embodiments are not so limited. For instance, the memory device 102 may include a number of memory arrays 110 (e.g., a number of banks of DRAM cells, NAND flash cells, etc.).

The memory device 102 can include address circuitry 104 to latch address signals for data provided over an input/output "I/O" bus 130 (e.g., data bus and/or address bus) through I/O circuitry 109 (e.g., provided to external ALU circuitry and to DRAM DQs via local I/O lines and global I/O lines). The I/O bus 130 can include, for example, a physical interface (e.g., a data bus, an address bus, and a command bus, or a combined data/address/command bus) employing a suitable protocol. Such protocol can be custom or proprietary, or the I/O bus 130 can employ a standardized protocol, such as Peripheral Component Interconnect Express (PCIe), Gen-Z interconnect, cache coherent interconnect for accelerators (CCIX), or the like. Address signals are received through address circuitry 104 and decoded by a row decoder 105 and a column decoder 107 to access the memory array 110. Data can be read from the memory array 110 by sensing voltage and/or current changes on the digit lines using the sensing circuitry 106. The sensing circuitry 106 can read and latch a page (e.g., row) of data from the memory array 110. The I/O circuitry 109 can be used for bi-directional data communication with the host device 101 over the I/O bus 130. For example, signaling indicative of results of operations (e.g., image processing operations) performed by a DLA 122 can be communicated from the memory device 102 to the host device 101 via the I/O bus 130. Although not specifically illustrated by FIG. 1, the I/O circuitry 109 can include storage and decode logic (described further in association with FIG. 2). In a number of embodiments, sensing circuitry 106 can include a number of sense amplifiers and a respective number of compute components as will be discussed further herein. The write circuitry 108 can be used to write data to the memory array 110.

The controller 103 (e.g., memory controller) decodes signals provided by a control bus 128 from the host device 101. These signals can include chip enable signals, write enable signals, and address latch signals that are used to control operations performed on the memory array 110, including data read, data write, and data erase operations. The controller 103 can be used for bi-directional communication with the host device 101 over the control bus 128. In various embodiments, the controller 103 is responsible for executing instructions from the host device 101 and sequencing access to the memory array 110. The controller 103 can be a state machine, sequencer, or some other type of controller, and include hardware and/or firmware (e.g., microcode instructions) in the form of an application specific integrated circuit (ASIC). Although not specifically illustrated by FIG. 1, the I/O circuitry can include processing logic (described further in association with FIG. 2). The controller 103 can control, for example, generation of clock signals and application of the clock signals to a compute component in sensing circuitry in association with shifting data.

The memory device 102 can include a DLA 122. The DLA 122 can be positioned (placed) on or near an edge of the memory device 102. As illustrated by FIG. 1, the DLA 122 can be implemented external to the memory array 110. The controller 103 can be configured to direct operation of the DLA 122. For example, the controller 103 can provide signaling to the row decoder 105 and the column decoder 107 to communicate data from the memory array 110 to the DLA 122 to provide an input to an ANN model implemented on the DLA 122. The controller 103 can be configured to communicate a result of an ANN model implemented on the DLA 122 to the I/O circuitry 109 and/or to the memory array 110.

The DLA 122 can host an ANN. As illustrated by FIG. 1, the ANN models 123 are implemented on the DLA 122. The DLA 122 can have direct access to the memory array 110, via the sensing circuitry 106. The ANN models 123 can be executed on data written to the memory array 110. Different ANN models of the ANN models 123 can have different, respective computational capabilities. The ANN models 123 can include a heavy ANN model that yields results having at least a first accuracy. The ANN models 123 can include a light ANN model that yields results having at least a second accuracy that is lower than the first accuracy. The ANN models 123 can include a medium ANN model that yields results having at least a third accuracy that is lower than the first accuracy but higher than the second accuracy. As used herein, "medium" used in reference to an ANN model refers to a computational capability of the ANN model such that a medium ANN model can yield results that are not as accurate as results from executing a heavy ANN model but more accurate than results from executing a light ANN model.

In a number of embodiments, the controller 103 can be configured to dynamically select which of the ANN models 123 implemented on the DLA 122 to execute based on an accuracy of results from a prior execution of one of the ANN models. For example, the controller 103 can be configured to execute a heavy ANN model on data, stored by the memory array 110, corresponding to one or more images captured by an imaging device (represented by the host device 101). Subsequent to execution of the heavy ANN model, the controller 103 can execute a light ANN model on data, stored by the memory array 110, corresponding to at least one other image subsequently captured by the imaging device. In response to the accuracy of results from executing the light ANN model being lower than a threshold accuracy, the controller 103 can execute the heavy ANN model on data, stored by the memory array 110, corresponding to at least one other image subsequently captured by the imaging device.

In a number of embodiments, the controller 103 can execute the light ANN model on data, stored by the memory array 110, corresponding to at least one other image subsequently captured by the imaging device. The controller 103 can input a result from executing the heavy ANN model to subsequently execution of the light ANN model. For example, intermediate layers or end layers of a heavy ANN model can be input to a light ANN model. Using a result yielded by execution of the heavy ANN model as an input to execution of the light ANN model can avoid, or eliminate, duplication of computations already performed by execution of the heavy ANN model.

Embodiments of the present disclosure are not limited to initially executing a heavy ANN model, subsequently executing a light ANN model, and switching back to the heavy ANN model when the accuracy of results from executing the light ANN model is below a threshold accuracy. In a number of embodiments, the controller 103 can be configured to execute a light ANN model on data, stored by the memory array 110, corresponding to one or more images captured by an imaging device (represented by the host device 101). In response to the accuracy of results from executing the light ANN model being lower than a threshold accuracy, the controller 103 can be configured to execute a heavy ANN model on data, stored by the memory array 110, corresponding to at least one other image captured by the imaging device. Subsequent to execution of the heavy ANN model, the controller 103 can be configured to execute the light ANN model on data, stored by the memory array 110, corresponding to at least one other image captured by the imaging device.

In a number of embodiments, the controller 103 can be configured to select which of the ANN models 123 implemented on the DLA 122 to execute based on a power state of the host device 101 (e.g., an imaging device). For example, the ANN models 123 can include an ANN model having a high power requirement (e.g., at least 5 watts), such as a heavy ANN model, and another ANN model having a low power requirement (e.g., less than 5 watts, less than 1 watt), such as a light ANN model. The controller 103 can be configured to execute a light ANN model on data from the host device 101 in response to signaling indicative of the host device 101 being in a low-power state. The controller 103 can be configured to execute a heavy ANN model on the data from the host device 101 in response to signaling indicative of the host device 101 being in a high-power state.

As described further in association with FIGS. 2A-2F, an imaging device can operate in a low-power state, capturing images and/or video. Although executing the light ANN model can yield results of a lower accuracy than executing the heavy ANN model, because there is no change, or a change that is below a threshold level of difference, the less accurate results may be sufficient. Thus, executing the light ANN model when the imaging device is in a low-power state can reduce the power consumption of the memory device 102. When a change from one image to another, or a change from one image to another that satisfies a threshold level of difference, is detected, the imaging device can switch to a high-power state. Accordingly, the controller 103 can be configured to execute the heavy ANN model on data from the imaging device while in the high-power state. Because there is a change in the captured images, higher computational capability of the heavy ANN model relative to the light ANN model may be necessary to yield high-accuracy results.

FIGS. 2A-2F are an illustration of images 230-1, 230-2, 230-3, 230-4, 230-5, and 230-6, respectively, demonstrating a change in images captured by an imaging device in accordance with a number of embodiments of the present disclosure. FIGS. 2A-2F are representative and intended to demonstrate a concept. The images 230-1 to 230-6 are captured by an imaging device, such as an imaging device as represented by the host device 101 described in association with FIG. 1. The image 230-2 is captured subsequent to the image 230-1. The image 230-3 is captured subsequent to the image 230-2. The image 230-4 is captured subsequent to the image 230-3. The image 230-5 is captured subsequent to the image 230-4. The image 230-6 is captured subsequent to the image 230-5. The images 230-1 to 230-6 can be frames of a video. However, the images 230-1 to 230-6 are not necessarily consecutive frames of a video. The video can include intermediate frames not illustrated by FIGS. 2A-2F.

Each of the images 230-1 to 230-6 capture a triangle 232. As demonstrated by a comparison of FIGS. 2A and 2B, there is no change from the image 230-1 to the image 230-2. Thus, a light ANN model can be executed on data corresponding to the image 230-2 instead of executing a heavy ANN model because the computational capability of a light ANN model is sufficient. Executing a heavy ANN model on data corresponding to the image 230-2 may expend excess power.

In a number of embodiments, control circuitry of a memory device on which a light ANN model and a heavy ANN model are implemented, such as the controller 103, can be configured to execute a light ANN model on data corresponding to a subsequent image (e.g., the image 230-2) in response to that subsequent image (the image 230-2) not including a significant change relative to a previous image (e.g., the image 230-1). In a number of embodiments, an imaging device and/or a system including the imaging device that captured the images 230-1 and 230-2 can operate in a low-power state in response to the images 230-1 and 230-2 without a significant change from the image 230-1 to the image 230-2. Executing a light ANN model helps maintain the imaging device and/or system in a low-power operative state.

Determining whether there is a change from one image to another image can be based on a level of difference between the two images. For example, one or more anomaly detection algorithms can be executed to determine a level of difference between the two images. A DLA of the memory device, such as the DLA 122 described in association with FIG. 1, can be configured to execute one or more anomaly detection algorithms. Non-limiting examples of anomaly detection algorithms include isolation forest (iForest), one-class Support Vector Machines (SVMs), local outlier factor, and robust random cut forest (RRCF).

As demonstrated by a comparison of FIGS. 2B and 2C, there is a change from the image 230-2 to the image 230-3. The image 230-3 includes the circle 234. The circle 234 is a significant change from the image 230-2 to the image 230-3. Thus, an ANN model having higher computational capability can be executed on data corresponding to the image 230-3 to ensure that high-accuracy results are obtained.

In a number of embodiments, control circuitry of the memory device on which the light ANN model and the heavy ANN model are implemented can be configured to execute the heavy ANN model on data corresponding to an image (e.g., the image 230-3) in response to that image (the image 230-3) including a significant change relative to a previous image (e.g., the image 230-2). In a number of embodiments, the imaging device and/or the system including the imaging device can operate in a high-power state in response to the images 230-2 and 230-3 including a significant change. The imaging device can take images at an increased rate in response to a significant change from one image to another image.

As demonstrated by a comparison of FIGS. 2C and 2D, there is a change from the image 230-3 to the image 230-4. Although the circle 234 is still captured by the image 230-3, in the time from capture of the image 230-3 to capture of the image 230-4, the circle 234 has moved relative to the image 230-3. The movement of the circle 234 is a significant change from the image 230-3 to the image 230-4. Thus, an ANN model having higher computational capability can be executed on data corresponding to the image 230-4 to ensure that high-accuracy results are obtained.

Because there is a significant change from the image 230-3 to the image 230-4, the controller can be configured to execute the heavy ANN model (not to switch back to the light ANN model) on data corresponding to the image 230-4. The imaging device and/or the system including the imaging device can remain in the high-power state.

As demonstrated by a comparison of FIGS. 2D and 2E, there is a change from the image 230-4 to the image 230-5. The image 230-5 does not include the circle 234. Thus, an ANN model having higher computational capability can be executed on data corresponding to the image 230-5 to ensure that high-accuracy are obtained.

Because there is a significant change from the image 230-4 to the image 230-5, the control circuitry can be configured to execute the heavy ANN model (not to switch back to the light ANN model) on data corresponding to the image 230-5. The imaging device, or the system including the imaging device, can remain in the high-power state.

As demonstrated by a comparison of FIGS. 2E and 2F, there is no change from the image 230-5 to the image 230-6. Both the image 230-5 and the image 230-6 include just the triangle 232. Thus, the light ANN model can be executed on data corresponding to the image 230-6 instead of executing the heavy ANN model because the computational capability of the light ANN model is sufficient. Executing the heavy ANN model on data corresponding to the image 230-6 may expend excess power.

Because there is no change from the image 230-5 to the image 230-6, the control circuitry can be configured to execute the light ANN model (switch from the heavy ANN model to the light ANN model) on data corresponding to the image 230-6. The imaging device, or the system including the imaging device, can switch back to the low-power state. Executing a light ANN model helps maintain a low-power state.

Figure 3:
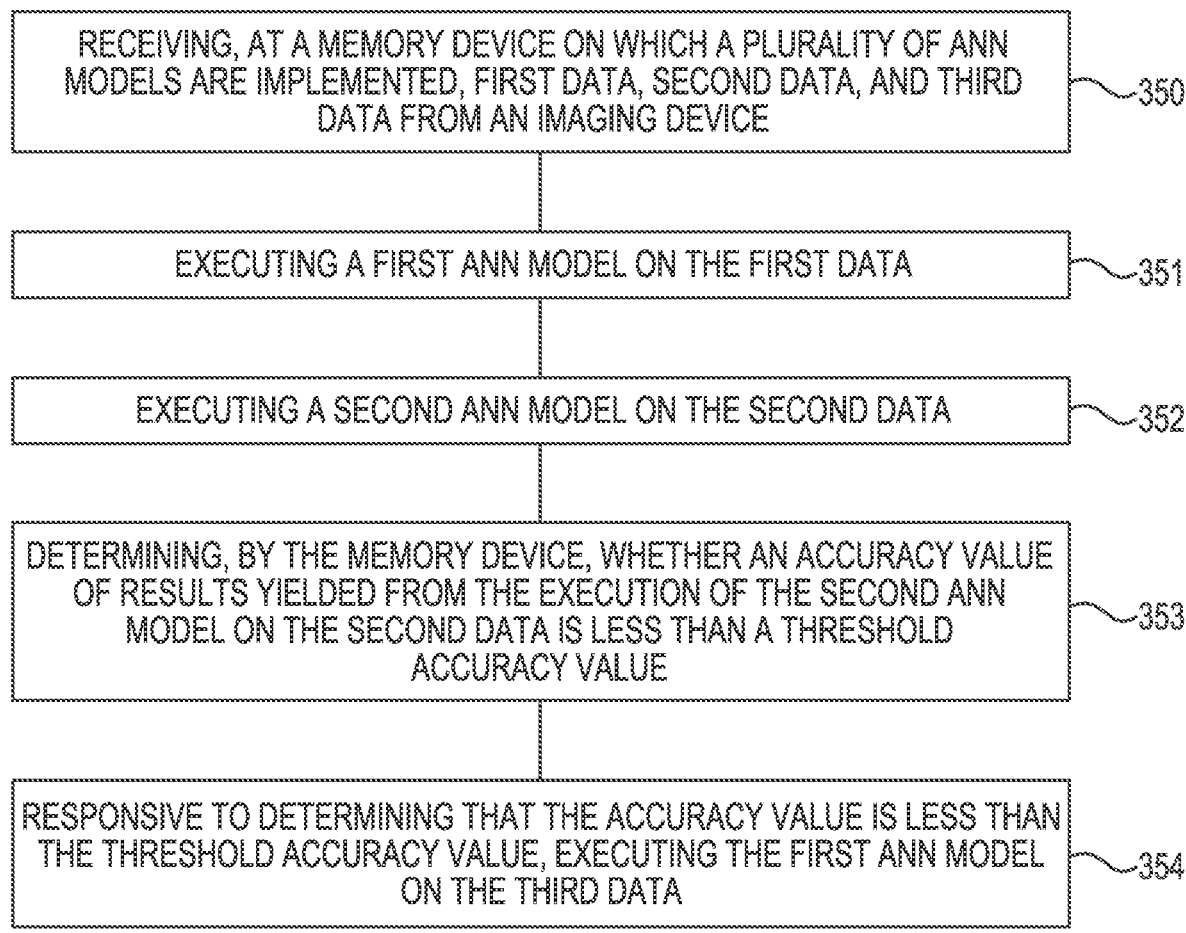
FIG. 3 is a flow diagram illustrating a method for selection of ANN models implemented on a memory device in accordance with a number of embodiments of the present disclosure.

FIG. 3 is a flow diagram illustrating a method for dynamic selection of ANN models implementing on a memory device in accordance with a number of embodiments of the present disclosure. The method described in association with FIG. 3 can be performed by, for example, the memory device 102 described in association with FIG. 1.

At block 350, the method can include receiving, at a memory device on which a plurality of ANN) models are implemented, first data, second data, and third data from an imaging device. The first data can correspond to a first image captured by the imaging device. The second data can correspond to a second image captured by the imaging device subsequent to the first image. The third data can correspond to a third image captured by the imaging device subsequent to the second image.

At block 351, the method can include executing a first ANN model on the first data. The first ANN model can be configured to yield results having at least a first minimum accuracy value.

At block 352, the method can include executing a second ANN model on the second data. The second ANN model can be configured to yield results having at least a second minimum accuracy value that is less than a threshold accuracy value and the first minimum accuracy value. The method can include using a result from executing the first ANN model on the first data as an input to executing the second ANN model on the second data.

At block 353, the method can include determining, by the memory device, whether an accuracy value of results yielded from the execution of the second ANN model on the second data is less than a threshold accuracy value. At block 355, the method can include, in response to determining that the accuracy value is less than the threshold accuracy value, executing the first ANN model on the third data.

Although not specifically illustrated by FIG. 3, the method can include receiving, at the memory device, fourth data from the imaging device corresponding to a fourth image captured by the imaging device subsequent to the third image. Whether another accuracy value of results yielded from the execution of the first ANN model on the third data is less than the threshold accuracy value can be determined by the memory device. In response to determining that the other accuracy value is less than the threshold accuracy value, the second ANN model can be executed on the fourth data.

Figure 4:
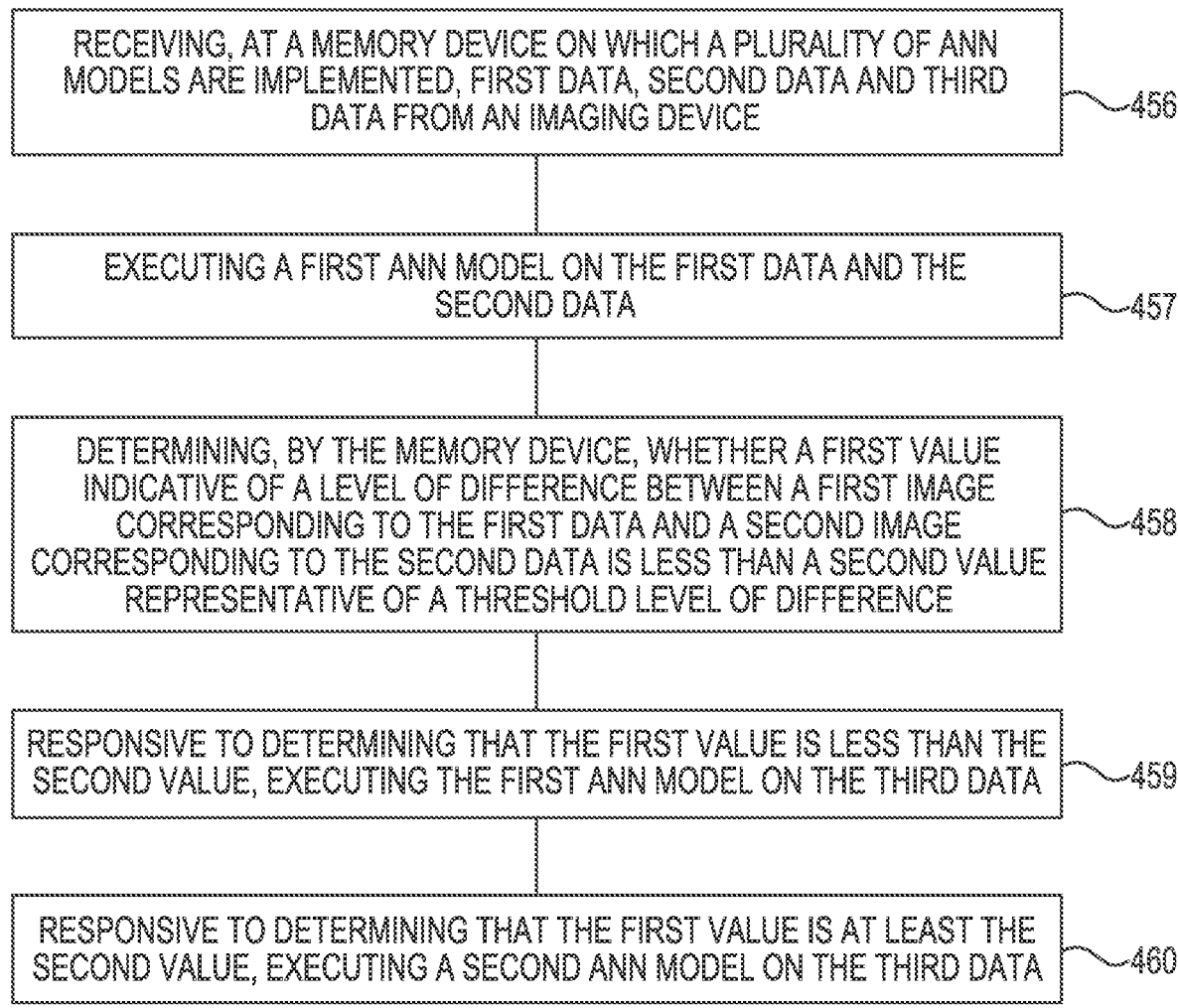
FIG. 4 is a flow diagram illustrating a method for selection of ANN models implemented on a memory device in accordance with a number of embodiments of the present disclosure.

FIG. 4 is a flow diagram illustrating a method for dynamic selection of ANN models implementing on a memory device in accordance with a number of embodiments of the present disclosure. The method described in association with FIG. 4 can be performed by, for example, the memory device 102 described in association with FIG. 1.

At block 456, the method can include receiving, at a memory device on which a plurality of ANN models are implemented, first data, second data and third data from an imaging device. The first data can correspond to a first image captured by the imaging device. The second data can correspond to a second image captured by the imaging device subsequent to the first image. The third data can correspond to a third image captured by the imaging device subsequent to the second image.

At block 457, the method can include executing a first ANN model on the first data and the second data. The first ANN model can be configured to yield results having at least a first minimum accuracy value.

At block 458, the method can include determining, by the memory device, whether a first value indicative of a level of difference between the first image and the second image is less than a second value representative of a threshold level of difference. At block 459, the method can include, in response to determining that the first value is less than the second value, executing the first ANN model on the third data. At block 460, the method can include, in response to determining that the first value is at least the second value, executing a second ANN model on the third data. The second ANN model can be configured to yield results having at least a second minimum accuracy value that is greater than the first minimum accuracy value.

Although not specifically illustrated by FIG. 4, the method can include determining, by the memory device, the first value indicative of the level of difference between the first image and the second image. Determining the first value can include performing an anomaly detection algorithm on the second image, or the second data corresponding to the second image. The method can further include receiving, at the memory device, fourth data from the imaging device corresponding to a fourth image captured by the imaging device subsequent to the third image. Whether a third value indicative of a level of difference between the second image and the third image is less than the second value can be determined by the memory device. In response to determining that the third value is less than the second value, the first ANN model can be executed on the fourth data. In response to determining that the third value is at least the second value, the second ANN model can be executed on the fourth data.

Figure 5:
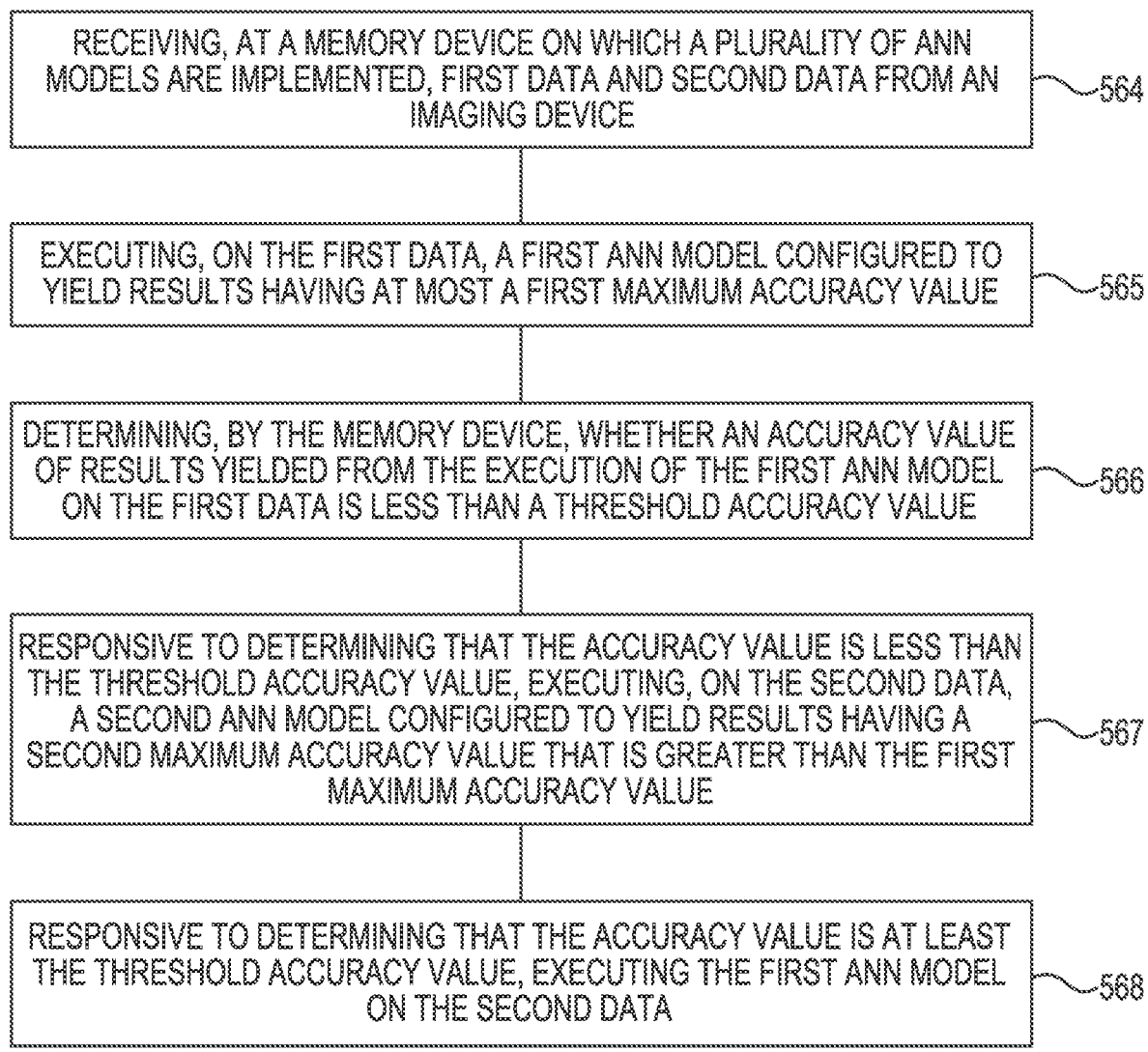
FIG. 5 is a flow diagram illustrating a method for selection of ANN models implemented on a memory device in accordance with a number of embodiments of the present disclosure.

FIG. 5 is a flow diagram illustrating a method for dynamic selection of ANN models implementing on a memory device in accordance with a number of embodiments of the present disclosure. The method described in association with FIG. 5 can be performed by, for example, the memory device 102 described in association with FIG. 1.

At block 564, the method can include receiving, at a memory device on which a plurality of ANN models are implemented, first data and second data from an imaging device. The first data can correspond to a first image captured by the imaging device. The second data can correspond to a second image captured by the imaging device subsequent to the first image. A first ANN model can be configured to yield results having at most a first maximum accuracy value. A second ANN model is configured to yield results having a second maximum accuracy value that is greater than the first maximum accuracy value. At block 565, the method can include executing the first ANN model on the first data.

At block 566, the method can include determining, by the memory device, whether an accuracy value of results yielded from the execution of the first ANN model on the first data is less than a threshold accuracy value. At block 567, the method can include, in response to determining that the accuracy value is less than the threshold accuracy value, executing the second ANN model on the second data. At block 568, the method can include, in response to determining that the accuracy value is at least the threshold accuracy value, executing the first ANN model on the second data.

Although not specifically illustrated by FIG. 5, the method can include receiving, at the memory device, third data from the imaging device corresponding to a third image captured by the imaging device subsequent to the second image. In response to executing the second ANN model on the second data, the first ANN model can be executed on the third data. In response to executing the first ANN model on the second data, whether another accuracy value of results yielded from the execution of the first ANN model on the second data is less than the threshold accuracy value can be determined by the memory device. In response to determining that the other accuracy value is at least the threshold accuracy value, the first ANN model can be executed on the third data. In response to determining that the other accuracy value is less than the threshold accuracy value, the second ANN model can be executed on the third data.

Figure 6:
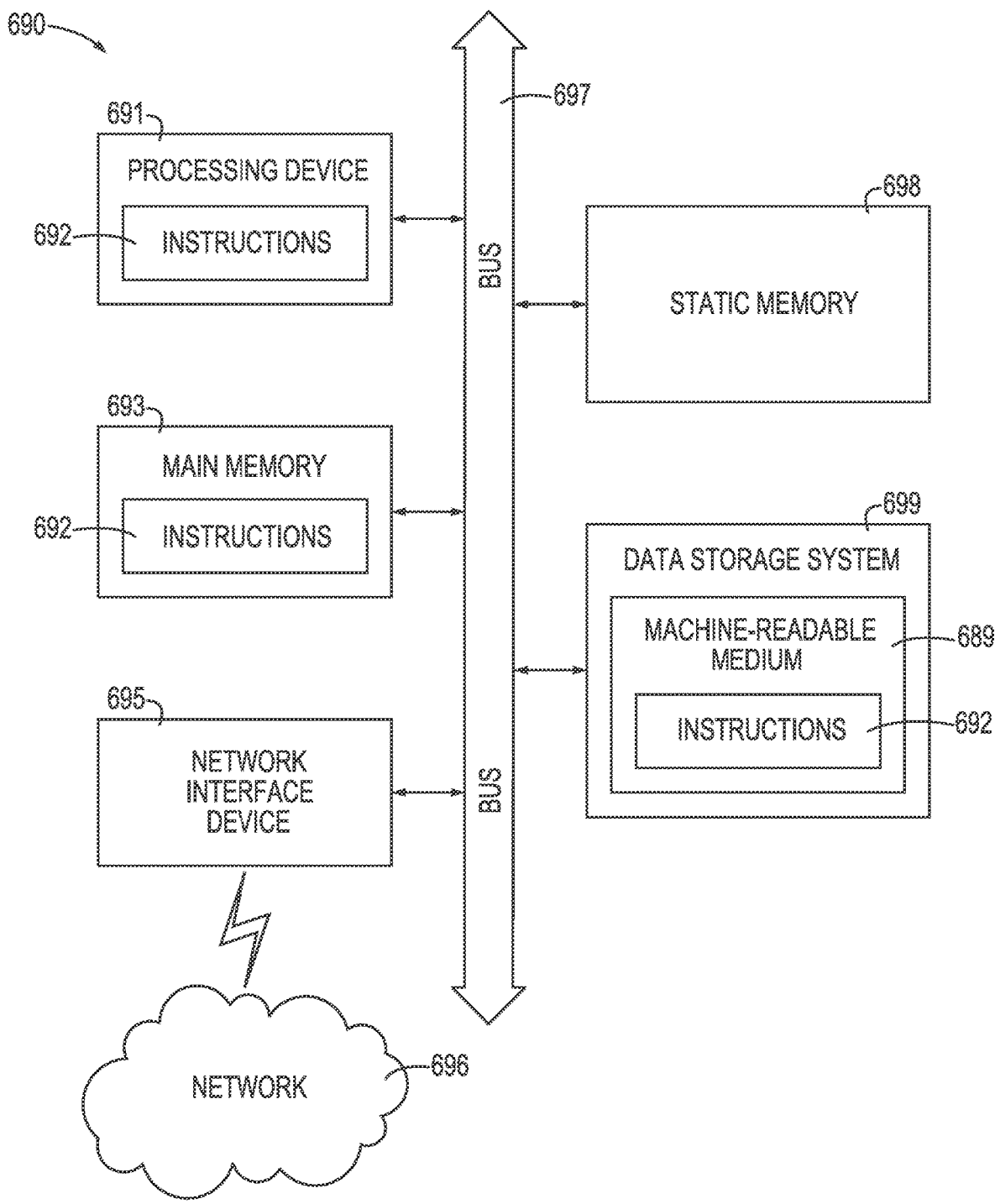
FIG. 6 illustrates an example machine of a computer system within which a set of instructions, for causing the machine to perform various methodologies discussed herein, can be executed.

FIG. 6 illustrates an example machine of a computer system 690 within which a set of instructions, for causing the machine to perform various methodologies discussed herein, can be executed. In various embodiments, the computer system 690 can correspond to a system (e.g., the system 100 described in association with FIG. 1) that includes, is coupled to, or utilizes a memory sub-system (e.g., the memory device 102) or can be used to perform the operations of a controller (e.g., the controller 103). In a number of embodiments, the machine can be connected (e.g., networked) to other machines in a local access network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 690 includes a processing device 691, a main memory 693 (e.g., ROM, flash memory, DRAM such as synchronous DRAM (SDRAM) or Rambus DRAM (RDRAM), etc.), a static memory 698 (e.g., flash memory, SRAM, etc.), and a data storage system 699, which communicate with each other via a bus 697.

A processing device 691 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 691 can also be one or more special-purpose processing devices such as an ASIC, a field programmable gate array (FPGA), a digital signal processor (DSP), network processor, or the like. The processing device 691 can be configured to execute instructions 692 for performing operations and method discussed herein. The computer system 690 can further include a network interface device 695 to communicate over the network 696.

The data storage system 699 can include a machine-readable storage medium 689 (also known as a computer-readable medium) on which is stored one or more sets of instructions 692 or software embodying any one or more of the methodologies or functions described herein. The instructions 692 can also reside, completely or at least partially, within the main memory 693 and/or within the processing device 691 during execution thereof by the computer system 690, the main memory 693 and the processing device 691 also constituting machine-readable storage media.

In a number of embodiments, the instructions 692 include instructions to implement functionality corresponding to the host device 101 and/or the memory device 102 described in association with FIG. 1. The instructions 692 can include instructions to determine an accuracy value of a result from executing, on first data from an imaging device, a first ANN model implemented on a memory device. Executing the first ANN model can have a first power requirement. The instructions 692 can include further instructions to determine whether the accuracy value is a first value or a second value. In response to determining that the accuracy value is the first value, the first ANN model on can be executed on second data from the imaging device. The first data can correspond to a first image captured by the imaging device. The second data can correspond to a second image captured by the imaging device subsequent to the first image. In response to determining that the accuracy value is the second value, a second ANN model implemented on the memory device can be executed on the second data. Execution of the second ANN model can have a second power requirement. The result from executing the first ANN model on the first data can be used as an input to executing the second ANN model on the second data.

In at least one embodiment, the first value can be at least a threshold accuracy value, the second value can be less than the threshold accuracy value, and the second power requirement can be greater than the first power requirement. In such embodiments, the first ANN model can be a light ANN model and the second ANN model can be a heavy ANN model.

In at least one embodiment, the second value can be at least a threshold accuracy value, the first value can be less than the threshold accuracy value, and the second power requirement can be less than the first power requirement. In such embodiments, the first ANN model can be a heavy ANN model and the second ANN model can be a light ANN model.

In a number of embodiments, the instructions 692 can include further instructions to determine whether the accuracy value is the first value, the second value, or a third value. In response to determining that the accuracy value is the third value, a third ANN model implemented on the memory device can be executed on the second data. The first value can be at least a first threshold accuracy value. The second value can be less than the first threshold accuracy value and at least a second threshold accuracy value. The third value can less than the second threshold accuracy value. Execution of the third ANN model can have a third power requirement. The first power requirement can be less than the second power requirement and the second power requirement can be less than the third power requirement. In such embodiments, the first ANN model can be a light ANN model, the second ANN model can be a medium ANN model, and the third ANN model can be a heavy ANN model.

While the machine-readable storage medium 689 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, at a memory device on which a plurality of artificial neural network (ANN) models are implemented, first data, second data, and third data from an imaging device,
   wherein the first data corresponds to a first image captured by the imaging device, the second data corresponds to a second image captured by the imaging device subsequent to the first image, and the third data corresponds to a third image captured by the imaging device subsequent to the second image;
   executing only a first ANN model on the first data;
   executing only a second ANN model on the second data;
   determining, by the memory device, whether an accuracy value of results yielded from the execution of the second ANN model on the second data is less than a threshold accuracy value; and
   responsive to determining that the accuracy value is less than the threshold accuracy value, executing only the first ANN model on the third data.

2. The method of claim 1, wherein the first ANN model is configured to yield results having at least a first minimum accuracy value, and
   wherein the second ANN model is configured to yield results having at least a second minimum accuracy value that is less than the threshold accuracy value and the first minimum accuracy value.

3. The method of claim 1, further comprising:
   receiving, at the memory device, fourth data from the imaging device corresponding to a fourth image captured by the imaging device subsequent to the third image;
   determining, by the memory device, whether another accuracy value of results yielded from the execution of the first ANN model on the third data is less than the threshold accuracy value; and
   responsive to determining that the other accuracy value is less than the threshold accuracy value, executing the second ANN model on the fourth data.

4. The method of claim 1, further comprising using a result from executing the first ANN model on the first data as an input to executing the second ANN model on the second data.

5. A method, comprising:
   receiving, at a memory device on which a plurality of artificial neural network (ANN) models are implemented, first data, second data and third data from an imaging device,
   wherein the first data corresponds to a first image captured by the imaging device, the second data corresponds to a second image captured by the imaging device subsequent to the first image, and the third data corresponds to a third image captured by the imaging device subsequent to the second image;
   executing only a first ANN model on the first data and the second data;
   determining, by the memory device, whether a first value indicative of a level of difference between the first image and the second image is less than a second value representative of a threshold level of difference;
   responsive to determining that the first value is less than the second value, executing only the first ANN model on the third data; and
   responsive to determining that the first value is at least the second value, executing only a second ANN model on the third data.

6. The method of claim 5, wherein the first ANN model is configured to yield results having at least a first minimum accuracy value, and
   wherein the second ANN model is configured to yield results having at least a second minimum accuracy value that is greater than the first minimum accuracy value.

7. The method of claim 5, further comprising determining, by the memory device, the first value indicative of the level of difference between the first image and the second image.

8. The method of claim 7, wherein determining the first value comprises performing an anomaly detection algorithm on the second image.

9. The method of claim 5, further comprising:
   receiving, at the memory device, fourth data from the imaging device corresponding to a fourth image captured by the imaging device subsequent to the third image;
   determining whether a third value indicative of a level of difference between the second image and the third image is less than the second value;
   responsive to determining that the third value is less than the second value, executing the first ANN model on the fourth data; and
   responsive to determining that the third value is at least the second value, executing the second ANN model on the fourth data.

10. A method, comprising:
    receiving, at a memory device on which a plurality of artificial neural network (ANN) models are implemented, first data and second data from an imaging device,
    wherein the first data corresponds to a first image captured by the imaging device and the second data corresponds to a second image captured by the imaging device subsequent to the first image,
    wherein a first ANN model is configured to yield results having at most a first maximum accuracy value, and
    wherein a second ANN model is configured to yield results having a second maximum accuracy value that is greater than the first maximum accuracy value;
    executing only the first ANN model on the first data;
    determining, by the memory device, whether an accuracy value of results yielded from the execution of the first ANN model on the first data is less than a threshold accuracy value;
    responsive to determining that the accuracy value is less than the threshold accuracy value, executing only the second ANN model on the second data; and
    responsive to determining that the accuracy value is at least the threshold accuracy value, executing only the first ANN model on the second data.

11. The method of claim 10, further comprising:
    receiving, at the memory device, third data from the imaging device corresponding to a third image captured by the imaging device subsequent to the second image;
    responsive to executing the second ANN model on the second data, executing the first ANN model on the third data; and responsive to executing the first ANN model on the second data:
- determining, by the memory device, whether another accuracy value of results yielded from the execution of the first ANN model on the second data is less than the threshold accuracy value;
- responsive to determining that the other accuracy value is at least the threshold accuracy value, executing the first ANN model on the third data; and
- responsive to determining that the other accuracy value is less than the threshold accuracy value, executing the second ANN model on the third data.

12. A system, comprising:
an imaging device configured to capture a first image and a second image subsequent to the first image; and
a memory device coupled to the imaging device and configured to:
- determine a first value indicative of a level of difference between the first image and the second image; and
- determine whether the first value is less than a second value representative of a threshold level of difference, wherein the memory device comprises:
- a plurality of artificial neural network (ANN) models implemented thereon; and
- control circuitry configured to:
  - responsive to determining that the first value is at least the second value, execute only a first ANN model on data corresponding to the second image; and
  - responsive to determining the first value is less than the second value, execute only a second ANN model on the data corresponding to the second image.

13. The system of claim 12, wherein the control circuitry is further configured to, responsive to signaling indicative of a switch of the imaging device from a high-power state to a low-power state, execute the second ANN model on the data corresponding to the second image.

14. The system of claim 13, wherein the control circuitry is further configured to, responsive to different signaling indicative of a switch of the imaging device from the low-power state to the high-power state, execute the first ANN model on the data corresponding to the second image.

15. The system of claim 12, wherein the first and second images are captured by the imaging device consecutively.

16. The system of claim 12, wherein the memory device and the imaging device comprise an Internet of Things (IoT) device.

17. A non-transitory machine-readable medium storing instructions executable by a processing resource to:
- determine an accuracy value of a result from executing, on first data from an imaging device, a first artificial neural network (ANN) model implemented on a memory device, wherein execution of the first ANN model has a first power requirement;
- determine whether the accuracy value is a first value or a second value;
- responsive to determining that the accuracy value is the first value, execute only the first ANN model on second data from the imaging device,
wherein the first data corresponds to a first image captured by the imaging device and the second data corresponds to a second image captured by the imaging device subsequent to the first image; and
- responsive to determining that the accuracy value is the second value, execute only a second ANN model implemented on the memory device on the second data, wherein execution of the second ANN model has a second power requirement different than the first power requirement.

18. The medium of claim 17, wherein the first value is at least a threshold accuracy value,
wherein the second value is less than the threshold accuracy value, and
wherein the second power requirement is greater than the first power requirement.

19. The medium of claim 17, wherein the second value is at least a threshold accuracy value,
wherein the first value is less than the threshold accuracy value, and
wherein the second power requirement is less than the first power requirement.

20. The medium of claim 19, further storing instructions to, responsive to determining that the accuracy value is the second value, use the result from executing the first ANN model on the first data as an input to executing the second ANN model on the second data.

21. The medium of claim 17, further storing instructions to:
- determine whether the accuracy value is the first value, the second value, or a third value; and
- responsive to determining that the accuracy value is the third value, execute a third ANN model implemented on the memory device on the second data,
wherein the first value is at least a first threshold accuracy value, the second value is less than the first threshold accuracy value and at least a second threshold accuracy value, and the third value is less than the second threshold accuracy value,
wherein execution of the third ANN model has a third power requirement different than the first and second power requirements, and
wherein the first power requirement is less than the second power requirement and the second power requirement is less than the third power requirement.

* * * * *